United States Patent [19]

Lyon

[11] 4,003,809

[45] * Jan. 18, 1977

[54] ISOTOPE SEPARATION PROCESS

[75] Inventor: Richard K. Lyon, Fanwood, N.J.

[73] Assignee: Exxon Research and Engineering Company, Linden, N.J.

[*] Notice: The portion of the term of this patent subsequent to Feb. 10, 1993, has been disclaimed.

[22] Filed: Apr. 23, 1975

[21] Appl. No.: 570,849

Related U.S. Application Data

[63] Continuation-in-part of Ser. No. 408,669, Oct. 23, 1973, Pat. No. 3,937,956.

[52] U.S. Cl. .................. 204/157.1 R; 204/DIG. 11
[51] Int. Cl.² .......................................... B01J 1/10
[58] Field of Search ............................. 204/DIG. 11

[56] References Cited

UNITED STATES PATENTS 3,941,670  3/1976  Pratt .............................. 204/158 R

FOREIGN PATENTS OR APPLICATIONS 1,284,620  8/1972  United Kingdom ........ 204/157.1 R

*Primary Examiner*—Howard S. Williams
*Attorney, Agent, or Firm*—Robert J. Baran

[57] ABSTRACT

The instant invention relates to a process for separating a material into two or more parts in each of which the abundances of the isotopes of a given element differ from the abundances of the isotopes of the same material in said material. More particularly, the invention relates to a method for the isotopically selective excitation of gas phase molecules by multiple infrared photon absorption followed by a step wherein more of the excited molecules than nonexcited molecules are converted to a chemically different form which may be separated by means known in the art. This invention is useful for, but not limited to, the separation of the principal isotopes of uranium.

15 Claims, 1 Drawing Figure

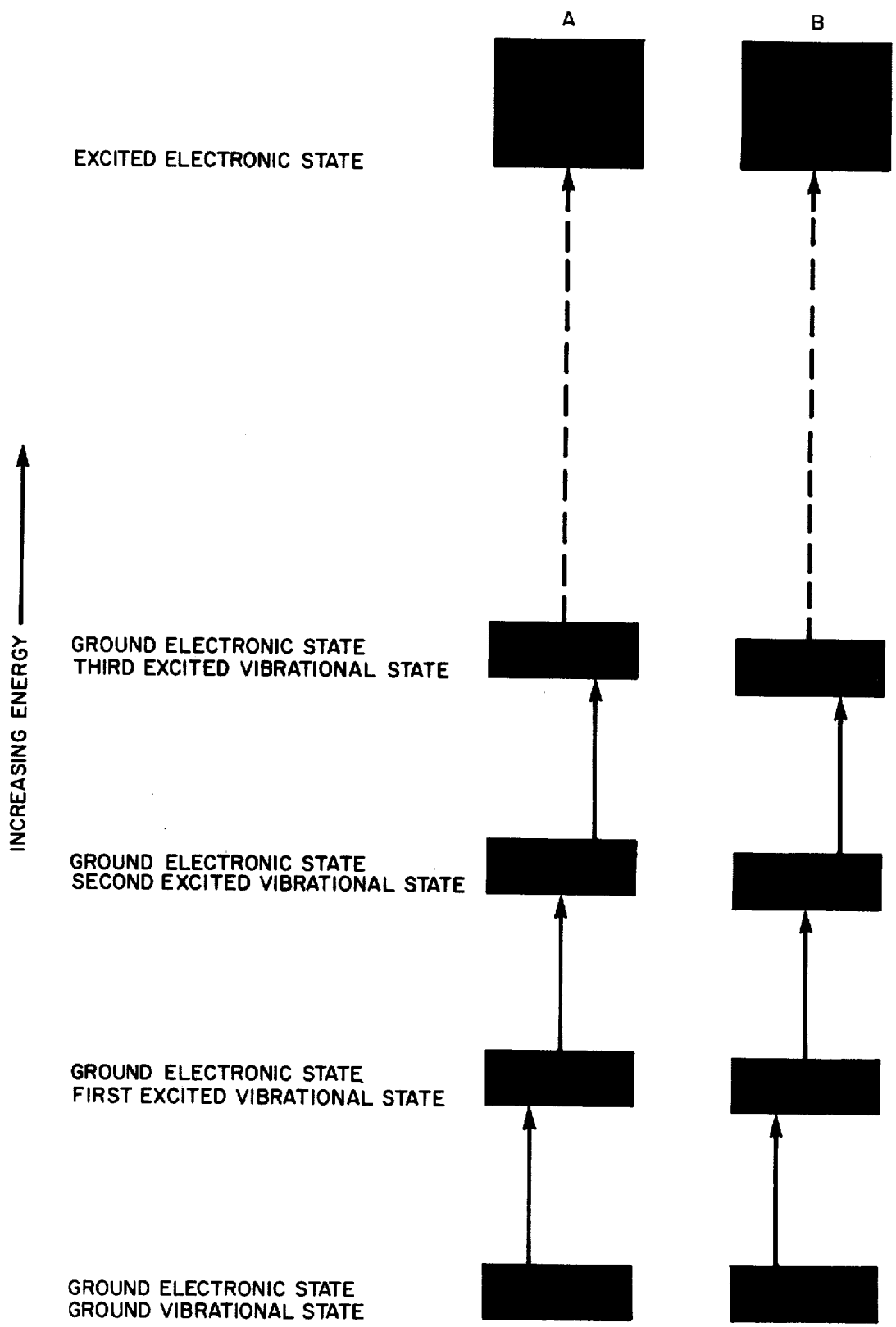

ISOTOPE SEPARATION PROCESS

RELATED APPLICATIONS

This application is a continuation-in-part of U.S. Ser. No. 408,669, filed on Oct. 23, 1973, now U.S. Pat. No. 3,937,956, in the name of R. K. Lyon now U.S. Pat. No. 3,937,956, granted Feb. 10, 1976.

FIELD OF THE INVENTION

The instant invention relates to a process for separating a material into two or more parts in each of which the abundances of the isotope of a given element differ from the abundances of the isotopes of the same material in said material. More particularly, the invention relates to a method for the isotopically selective excitation of gas phase molecules by multiple infrared photon absorption followed by a step wherein more of the excited molecules than nonexcited molecules are converted to a chemically different form which may be separated by means known in the art. This invention is useful for, but not limited to, the separation of the principal isotopes of uranium.

BACKGROUND OF THE PRIOR ART

In order that the instant invention may be clearly understood, it is useful to review the prior art relating to photochemical isotope separation. U.S. Pat. No. 2,713,025 and British Pat. No. 1,237,474 are good examples of processes for the photochemical separation of the isotopes of mercury. The first requirement for a photochemical isotope separation is that one finds conditions such that atoms or molecules of one isotope of a given element absorb light more strongly than do atoms or molecules of another isotope of said element. Mercury is a volatile metal and readily forms a vapor of atoms. Said atoms absorb ultraviolet light at 2537 A. The absorption line of $Hg^{202}$ is displaced by about 0.01 A with respect to the absorption line of $Hg^{200}$. Since absorption lines are extremely narrow, one may by use of a light in a critically narrow wavelength region excite either $Hg^{200}$ or $Hg^{202}$ without substantially exciting the other, depending on the exact wavelength used.

The second requirement for a photochemical isotope separation is that those atoms or molecules which are excited by light undergo some process which the atoms or molecules which have not been excited to not undergo, or at least do not undergo as rapidly. A quantum of 2537 A ultraviolet light imparts an excitation of 112.7 Kcal/mole to the mercury atom which absorbs it. The number of mercury atoms which at room temperature are thermally excited to this energy is vanishingly small, hence the atoms excited by light are not diluted by atoms excited by thermal means. Atoms of this high excitation readily undergo reactions with $H_2O$ (as taught in the U.S. patent) or with $O_2$, HCl or butadiene (as taught in the British patent), said reactions not occurring at room temperature with unexcited mercury.

Uranium, however, is a highly refractory metal, boiling only at extremely high temperatures. Thus, use of the above-described process with uranium atoms instead of mercury involves obvious difficulties. The most volatile form of uranium is $UF_6$. $U^{235}F_6$ and $U^{238}F_6$ both absorb ultraviolet light and do so to exactly the same extent at all wavelengths in the UV; hence, UV excitation of $UF_6$ does not satisfy the first requirement of photochemical isotope separation. However, $UF_6$ will absorb infrared light in the region around 626 cm$^{-1}$ (the $V_3$ band) and 189 cm$^{-1}$ (the $V_4$ band), and at the various other wave lengths, in the IR region, reported by McDowell et al., Journal of Chemical Physics, 61, pp. 3571–3580. Both the $V_3$ and $V_4$ bands of $U^{235}F_6$ are shifted slightly toward higher energy with respect to the $V_3$ and V bands of $U^{238}F_6$ respectively, but the size of these shifts is small compared to the width of the bands; in other words, the infrared absorption spectra of $U^{238}F_6$ and $U^{235}F_6$ do not exactly coincide, but they overlap at all wavelengths so that if one isotope absorbs light, so, to a substantial degree, will the other. Hence the infrared excitation of $UF_6$ by absorption of single IR photon is a process of limited isotopic selectivity.

The second requirement for isotope separation is also a matter of some difficulty for $UF_6$. $UF_6$ molecules which are excited by IR light are no different from molecules which have received the same energy by thermal excitation. Whatever process the photoexcited molecules will undergo, those molecules which are thermally excited to the same energy will also undergo. This dilution of the photoexcited molecules with thermally excited molecules will further decrease the isotopic separation factor.

The process of the instant invention is schematically illustrated in the FIGURE. This process is applicable to isotopic separation of uranium isotopes using $UF_6$ but is by no means limited thereto. Hence, in the FIGURE let A designate a molecule containing an atom of the lighter isotope of some element whose isotopes we desire to separate and let B designate the corresponding molecule containing the heavier isotope of said element. The ways in which a molecule may contain energy are called the degrees of freedom. It is well known that molecules have three different kinds of internal degrees of freedom, rotational, vibrational, and electronic. That is, a molecule may contain energy by spinning about its axis, it may contain energy because its atoms are vibrating against each other, and it may contain energy by virtue of having one or more of its electrons in higher energy orbits.

All of these forms of energy are quantized, that is a molecule may hold only certain discrete amounts of energy in each of these forms. In general, for a given molecule the rotational quanta will be the smallest and the electronic the largest. A molecule containing the absolute minimum possible energy would be said to be in the ground electronic, ground vibrational, ground rotational state. Because rotational quanta are very small, rotationally excited states are populated even at very low temperatures. Hence in the FIGURE the ground vibrational state of the ground electronic level is shown not as a single line but as a band because within the ground vibrational, ground electronic state the molecules are distributed among many rotational levels.

The instant invention is a three-step process, the first step being that the molecules to be isotopically separated are irradiated with a high power infrared laser under a critical set of conditions described hereinafter. The effect of this irradiation is to cause molecules of A and B to absorb IR photons and be progressively excited from the ground vibrational state to the first excited vibrational state, to the second excited vibrational state, to the third excited vibrational state, etc. It is to be noted that spacing between the vibrational levels of A and B is not exactly the same, although the difference in spacing of the levels is small compared to their width. Thus both A and B absorb the infrared laser radiation, but depending on the wavelength of the laser one will do so faster than the other. Hence, the isotopic selectivity of the absorption process is compounded as molecules are progressively excited up the vibrational ladder. Further, the total vibrational energy given the molecule is that of several infrared photons; hence the molecules are excited to levels but little populated by thermal means and dilution of photo-excited molecules by thermally excited molecules is minimized.

It will at once be realized that if A and B are polyatomic molecules they have several vibrational degrees of freedom. $UF_6$, for example, has 15 degrees of freedom, but because of its symmetry only six normal modes of vibration. Thus, to specify the vibrational state of $UF_6$ one must specify how many quanta of vibrational energy are in each of these six modes. The ground state would be designated $UF_6$ (0,0,0,0,0,0). If the IR laser were tuned to the $V_3$ band of $UF_6$, the sequential excitation process shown in FIG. 1 would be described by

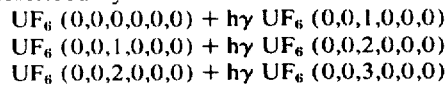

$UF_6$ (0,0,0,0,0,0) + h$\gamma$ $UF_6$ (0,0,1,0,0,0)
$UF_6$ (0,0,1,0,0,0) + h$\gamma$ $UF_6$ (0,0,2,0,0,0)
$UF_6$ (0,0,2,0,0,0) + h$\gamma$ $UF_6$ (0,0,3,0,0,0)

It is well known that $UF_6$ has many low energy vibrational states which at room temperature are substantially populated. Hence, the sequential excitation process shown in FIG. 1 is not the only such process occurring but is merely a representative of many similar processes.

The physics of sequential multiple IR photon absorption have been discussed by Letokhov and Maharov, Soviet Physics, JETP, 36, 1091 (1973). They are concerned with "selective excitation of molecule vibration by laser radiation." In this context "selective excitation" refers to the excitation of molecular vibration without excitation of the electronic, rotational and translational degrees of freedom. Letokhov and Maharov refer to sequential multiple photon absorption as "cascade excitation" and they conclude "Thus the rate of the cascade excitation of the high vibrational levels is low." In no manner do they teach, show or suggest that sequential multiple IR photon absorption could be useful for isotope separation.

The second step of the instant invention is the conversion of more of the excited molecules than nonexcited molecules to produce a product which is recovered in the third step by means known in the art. It will be recognized that the multiple photon activation of the molecules is a method of heating molecules of one isotope more than molecules of the other isotope, hence, the second step may be any process whose rate depends on temperature. However, for optimum results certain criteria must be met. These criteria pertain to the choice of the conversion process and to the conditions under which the conversion is done and are discussed below.

Thus, in the first two steps of the instant invention, A and B are converted with isotopic selectivity into some chemically different substance. The third step of the instant invention is the recovery of said substance by any of the means known in the art.

From the above description, the instant invention is readily distinguished from the prior art. U.S. Pat. No. 3,443,087 teaches the separation of $U^{235}F_6$ from $U^{238}F_6$ by selectively exciting one of them with an infrared laser then ionizing said excited molecules with ultraviolet light and recovering the ions by means of electric and/or magnetic fields or chemical reactions. In a review entitled "Photochemical Isotope Separation As Applied To Uranium" (Union Carbide Corporation Nuclear Division, Oak Ridge Gaseous Diffusion Plant, Mar. 15, 1972, K-L-3054, Revision 1, page 29), Farrar and Smith discuss the abovementioned patent and comment unfavorably on the practicality of the proposed second step of photo ionization. As an alternative, they suggest photodissociation. However, both U.S. Pat. No. 3,443,087 and Farrar and Smith explicitly teach that each $UF_6$ molecule undergoing the photoexcitation step acquires an energy corresponding to one infrared photon. Thus, neither Farrar and Smith nor U.S. Pat. NO. 3,443,087 teach, show or suggest the use of multiple IR photon absorption.

British Pat. No. 1,284,620, German Pat. No. 1,959,767 and German Pat. No. 2,150,232 teach the use of infrared radiation to selectively excite molecules which then undergo chemical reaction which the unexcited molecules undergo more slowly. The energy given the molecules during the infrared excitation step is explicitly taught to be the energy of a single IR photon, and these references neither teach, show, nor suggest the use of multiple infrared photon absorption.

It is to be recognized that excitation by multiple infrared photon absorption is entirely different from repeating the step of excitation by single infrared photon absorption. The conditions necessary to achieve excitation by single infrared photon absorption are merely that molecules be irradiated with infrared radiation of an appropriate wavelength. A set of critical conditions must be maintained if multiple infrared photon absorption is to occur. Multiple infrared photon absorption requires the use of a high power infrared laser, specifically said laser must emit at least $10^4$ watts per cm$^2$ per torr pressure of the gas which contains the isotopes that are being separated.

Further, the time the gas molecules are subjected to this high power infrared radiation must be between $10^{-10}$ and $5 \times 10^{-5}$ seconds. Thus, if the sum of the partial pressures of A and B is 2 torr, a power density of at least $2 \times 10^4$ watts/cm$^2$ is required. Failure to use at least this critical power density will have the result that the time required for the multiple photon excitation process will not be short compared to the average interval between collisions of A and B molecules. During such collisions, transfer of vibration excitation may occur, with the result that the excitation process loses its isotopic selectivity.

Although a power density of at least $10^4$ watts per cm$^2$ per torr pressure of said gas, it is preferred to use a power density of at least $10^5$ watts per cm$^2$ per torr pressure of said gas and most preferred to use a power density of at least $10^6$ watts per cm$^2$ per torr pressure of said gas.

If the isotopic molecule to be separated is $UF_6$ the tunable IR laser described by Hanna et al, Applied Physics Letters, 25, No. 3, pp. 142-144, may be used in carrying out the first, i.e., the selective multiple infrared photon absorption step, of the instant invention.

The second requirement for a multiple infrared photon absorption is the presence of a second gas, the partial pressure of said gas being at least 5, preferably between 5 and 100,000, and most preferably between 100 and 10,000 times the partial pressure of A and B. The reason said second gas is needed is subtle and relates to an effect known as anharmonicity. The levels of the vibrational ladder shown in the FIGURE are not exactly uniformly spaced but become slightly closer together as one goes up the ladder. This effect is known as anharmonicity, because for a perfect harmonic oscillator the energy levels would be uniformly spaced. It is also well known that a molecule in a given rotational state J may absorb infrared radiation and go the next higher vibrational level and either rotational level quantum number J + 1, rotational level quantum number J, or rotational level quantum number J-1. Hence, for a group of molecules in a thermal equilibrium distribution, there are three distinct absorption processes and the infrared absorption band is composed of three branches, the R branch (transitions in which the rotational quantum number increases by 1), the Q branch (transitions in which the rotational quantum number is not changed), and the P branch (transitions in which the rotational quantum number decreases by 1). The effect of anharmonicity upon the process of the instant invention is as follows: Let the infrared laser emit radiation of wavelength $\lambda$. Let said wavelength $\lambda$ be within the R branch of an infrared absorption band of A and B. There will be some rotational quantum number J such that molecules of A in the ground vibrational state may absorb radiation of wavelength $\lambda$ and be raised to the first excited vibrational state and rotational state J + 1. However, because of anharmonicity molecules of A must be in some rotational state other than J + 1 in order to absorb radiation of wavelength $\lambda$ and go from the first to the second excited vibrational state. Thus, a means by which molecules may change their rotational state is needed. Any molecular collision may cause rotational relaxation, i.e., put molecules back into a thermal distribution among the rotational energy levels, but if said collision is between A and B molecules transfer of vibrational excitation may also occur. This would have the effect of destroying the isotopic selectivity of the excitation process. Accordingly, it is the teaching of this invention that a second gas be provided as specified above in order that rotational relaxation may occur during the sequential excitation process.

The sequential excitation process may occur if the above critical requirements are met, but if said process is to have an optimum isotopic selectivity other requirements must be met. The first of these requirements relates to the degree of conversion achieved in the first step. If nearly all of the irradiated A and B molecules are excited to vibrational energies such that they may undergo step 2, then the product collected in step 3 will have nearly the same isotopic composition as the starting material and only a poor isotope separation will be achieved. On the other hand, if an extremely low degree of conversion is used, the molecules which are isotopically selectively excited by infrared radiation will be substantially diluted with those which are nonselectively excited by thermal means. Hence, there clearly exists an optimum conversion for the first step of the instant invention. The energy density to which the A and B molecules are subjected must be controlled to achieve said optimum conversion. The optimum energy density depends to some extent on the exact wavelength which the IR laser emits, but it is preferred that the molecules undergoing isotopic separation be subjected to no less than $10^{-3}$ joules/cm$^2$ nor more than $10^3$ joules/cm$^2$ during the performance of step one of the instant invention. It is most preferred that the energy density shall be in the range 0.1 to 100 joules/cm$^2$.

The optimum wavelength for the infrared laser depends on what molecule is being used. If A and B are $U^{235}F_6$ and $U^{238}F_6$ operation of the IR laser is in the range 620 to 645 cm$^{-1}$ (the R branch of the $V_3$ band of UF$_6$) or in the range 189 cm$^{-1}$ to 204 cm$^{-1}$ (the R branch of the $V_4$ band). In general, one may use the R branch of any vibrational band, provided that said band corresponds to a normal mode of vibration in which there is particucupation of the element whose isotopes it is desired to separate. The R branch is preferred because it is preferred to selectively excite A, that is to selectively excite molecules containing the lighter of the isotopes being separated. The reason for this is related to anharmonicity. As a molecule is progressively excited up the vibrational ladder, its absorption spectra shifts toward lower energy. Thus, if the infrared laser is operating on the low energy edge of the absorption band, the P branch, the rate at which molecules will absorb IR radiation increases as they go up the vibrational ladder, but the isotopic selectivity of said absorption decreases. Conversely, if the laser is operating in the R branch, the rate of radiation absorption decreases but the isotopic selectivity increases. This is a more favorable situation for the overall separation.

In the FIGURE, $E_v$ is shown as three times the energy of a vibrational quanta. $E_v$ may be greater or less than this without going beyond the scope of this invention.

The sequential multiple photon activation discussed above is distinguished from the prior art in another important respect; the prior art, as, for example, discussed by Farrar and Smith, contains a critical requirement which does not occur in the instant invention. In Farrar and Smith the possibility is discussed that an isotopically highly selective single photon activation might be achieved by use of the rotational fine structure of a vibrational absorption band. The use of rotational fine structure require operation at very low pressures in order that pressure broadening shall not smear out the rotational fine structure, and requires operation of the laser so as to produce extremely monochromatic light, light with a band width less than the spacing between rotational lines. Activation by sequential multiple photon absorption does not depend on rotational fine structure and may be preformed under pressures high enough to cause smearing of the rotational fine structure and may be performed with infrared laser light having a bandwidth greater than the spacing of rotational lines.

After the step of isotopically selective excitation by multiple infrared photon absorption, the excited molecules are converted to a recoverable product. Since the excitation step is an isotopically selective heating, said conversion may be accomplished by any means whose rate is temperature sensitive, however, it is preferred that said second step be either photolysis with visible or UV light or chemical reaction. Each of these processes has preferred conditions under which it will yield optimum results.

In the case of photolysis it is preferred to operate the process so that the molecules which contain the element whose isotopes are being separated are at a temperature less than 400° K before being irradiated by the IR laser. It is also preferred to use a second gas which is not chemically reactive toward the molecules which contain the element whose isotopes are being separated and it is preferred that said second gas be either a diatomic gas or an atomic gas. In the case in which the gaseous molecules containing the element whose isotopes are being separated is $UF_6$, the preferred second gases are $N_2$, $O_2$, He, Ne, Ar, Kr, Xe and mixture thereof. Further, it is preferred that the source of visible or UV light be a laser and the time during which molecules of the gas which contains the isotopes being separated are subjected to radiation from said visible or UV laser preferably be less than $5 \times 10^{-5}$ seconds. Further, it is preferred that the total time the molecules of the gas which contains the isotopes be separated are subject to radiation from both the infrared laser and the visible or UV laser be between $10^{-10}$ and $5 \times 10^{-5}$ seconds, however it is not necessary that the first step be completed before the second step is begun.

It is preferred to choose the wavelength of the visible or UV laser so that said wavelength is at or near the long wavelength edge of a photodissociation continuum of the molecule which contains the isotopes being separated. In the case of $UF_6$, it is preferred that the second step laser operate between 2400 A and 4600 A. It is most preferred that the second laser operate between 3200 and 3600 A. The second step laser may be a nitrogen laser.

If the second step is conversion by means of chemical reaction it is preferred that the conversion shall occur in the gas phase. The conversion will involve contact between the excited molecules and some species hereinafter designated the reagent. By contacting the reagent the excited molecules may become converted or may become deexcited. In order to minimize the latter undesirable process the reagent is preferably a specie containing three or fewer atoms.

Further, it is desirable that the reagent chosen should not be entirely inert toward the unexcited isotopic molecules, since such a reagent will react slowly and inefficiently with the selectively excited isotopic molecules and that the reagent chosen should not be excessively reactive toward the unexcited isotopic molecules since this will also lead to a poor isotope separation.

There is a time that the reagent and isotopic molecule are in contact and at a temperature such that reaction may occur at significant rate. This time is designated as time-at-temperature. In the process of this invention, any portion of the time-at-temperature which occurs before the laser irradiates the isotopic molecules serves no useful purpose and may result in contraproductive reaction between the reagent and the unexcited isotopic molecules. Accordingly, this time is to be minimized by any means known in the art such as a flow system with rapid mixing of the reactants. Further, under most conditions the lifetime of the selectively excited isotopic molecules will be less than $10^{-3}$ seconds and any portion of the time-at-temperature which occurs after this time is also contraproductive and to be minimized by any means known in the art such as use of a flow system with rapid cooling.

The IR laser is both a means of selectively exciting the isotopic molecules and to some extent of unselectively heating the irradiated gas. Thus, if one adjusts conditions so that the heat provided by the laser may be removed at an appropriate rate, the required time-at-temperature may be achieved. Alternatively one may use a variety of other means known in the art.

The temperature before IR irradiation must be chosen carefully in accordance with the reagent and isotopic molecule chosen and the method of contacting and regulating the time-at-temperature but in general temperatures less than 600° K are preferred.

Although there is some expense involved in recycling unused reagent, some excess reagent is desirable to assure efficient recovery of the selectively excited isotopic molecules. The selectively excited isotopic molecules will be a small portion of total isotopic molecules, hence, a mole ratio of reagent to isotopic molecules of 0.1 to 100 is satisfactory if the reagent is an atomic specie. If the reagent is a molecular specie, a value of said ratio of 5 to $10^4$ is satisfactory since the recovery and recycle of molecular species is considerably less difficult than the recovery and recycle of atomic species.

As stated above the second gas, if suitably chosen, may serve both to facilitate the selective excitation and serve as the reagent with which the selectively excited molecules react.

One may without going beyond the scope of this invention use a complex chemically reaction system which generates the desired reagent as a transient intermediate and which inherently provides the desired time at temperature.

One may without going beyond the scope of this invention operate the chemical reaction step under conditions such that all the molecules containing the isotope being separated react to form more than one chemically different product and the isotopically selective excitation causes said products to be of dfferent isotopic composition.

Naturally the skilled artisan will adjust the various process parameters within the limits taught by the instant invention to obtain the most efficient overall process. For example, the optimum energy density will in general depend on the exact wavelength of the infrared laser. Likewise, the skilled artisan will adjust the temperature and pressure of the irradiated gas for optimum results. As taught above, the instant invention does not require that the infrared laser be highly monochromatic and in some cases the skilled artisan may choose to increase the bandwidth of his infrared laser in order that molecules in larger part of the rotational distribution may absorb the infrared radiation.

PREFERRED EMBODIMENT

Uranium ore of natural isotopic distribution is converted to $UF_6$ vapor by means well known in the art. Said $UF_6$ is contacted with atomic hydrogen or with an atomic hydrogen inert gas mixture and is irradiated with an infrared laser at an IR frequency of from 620 to 645 cm$^{-1}$ or from 189 to 204 cm$^{-1}$, at a power density of at least $10^4$ watts per cm$^2$ per torr pressure of $UF_6$, at an energy density of $10^{-3}$ to $10^{-3}$ joules per cm$^2$, for an irradiation time of $10^{-10}$ to $5 \times 10^{-5}$ seconds, said atomic hydrogen having a partial pressure of 0.1 to 100 times the partial pressure of the $UF_6$, said inert gas having a partial pressure large enough so that the sum of the partial pressure of inert gas and of atomic hydrogen is 5 to 10,000 times the partial pressure of the $UF_6$, said contacting being done at a temperature less than 600° K, the time during which $UF_6$ is in contact with atomic hydrogen at said temperature being less than $10^{-3}$ seconds and the partial pressure of $UF_6$ being $10^{-4}$ to 100 torr. Under the above conditions the reaction $UF_6 + H \rightarrow UF_5 + H$ occurs with isotopic selectivity and the $UF_5$ may be recovered by any of the means known in the art, including, for example, reaction with $O_2$ to form a uranium oxyfluoride.

What is claimed is:

1. A method of separating the isotopes of an element, said method being applied to a gaseous compound of said element, and said method comprising subjecting molecules of said compound to radiation from an IR laser at or about a predetermined frequency at a power density of at least $10^4$ watts per $cm^2$ per torr pressure of the gaseous compound for a time between $10^{-10}$ and $5 \times 10^{-5}$ seconds, in the presence of a second gas, said second gas partial pressure being at least 5 times the partial pressure of said gaseous compound, whereby the molecules containing the isotope or isotopes are preferentially excited and sequentially absorb more than 1 quanta of IR radiation, preferentially converting the excited molecules by any means whose rate or selectivity is sensitive to temperature and separating said converted molecules from the molecules which are either unconverted or have been converted to some chemically different product.

2. The method of claim 1 wherein said gaseous compound is a compound of uranium.

3. The method of claim 2 wherein the excited molecules are converted by reaction with an appropriately chosen reagent, said reagent being a gas, the second gas being either said reagent or being a mixture of which the reagent is part.

4. The method of claim 2 wherein said gaseous uranium compound is subjected to IR light at an energy density of between $10^{-3}$ joules per $cm^2$ and $10^3$ joules per $cm^2$.

5. The method of claim 4 wherein said IR laser operates within the wavelength range corresponding to an R branch of a vibrational absorption band of said gaseous uranium compound, said vibrational absorption band corresponding to a mode of molecular motion in which the uranium participates.

6. The method of claim 5 wherein the energy density is between 0.1 and 100 joules per $cm^2$, the power density is greater than $10^6$ watts per $cm^2$ per torr pressure of the gaseous uranium compound, and the partial pressure of said second gas is between 100 and 10,000 times the partial pressure of the gaseous uranium compound.

7. The method of claim 4 wherein the gaseous uranium compound is $UF_6$, and wherein said IR frequency ranges from 620 to 645 $cm^{-1}$.

8. The method of claim 7 wherein the energy density is between 0.1 and 100 joules per $cm^2$, the power density is greater than $10^6$ watts per $cm^2$ per torr pressure of the $UF_6$, and the partial pressure of said second gas is between 100 and 10,000 times the partial pressure of the $UF_6$.

9. The method of claim 8 wherein the reagent is atomic hydrogen and wherein the time the $UF_6$ and atomic hydrogen are in contact and at the reaction temperature is less than $10^{-3}$ seconds.

10. The method of claim 4 wherein the gaseous uranium compound is $UF_6$ and wherein said IR frequency ranges from 189 to 204 $cm^{-1}$.

11. The method of claim 10 wherein the energy density is between 0.1 and 100 joules per $cm^2$, the power density is greater than $10^6$ watts per $cm^2$ per torr pressure of $UF_6$, and the partial pressure of said second gas is between 100 and 10,000 times the partial pressure of $UF_6$.

12. The method of claim 11 wherein the reagent is atomic hydrogen and wherein the time the $UF_6$ and atomic hydrogen are in contact and at the reaction temperature is less than $10^{-3}$ seconds.

13. The method of claim 6 wherein the excited molecules are converted by reaction with an appropriately chosen reagent, said reagent being an atomic gas, a diatomic gas, or a triatomic gas, the second gas being either said reagent or a mixture of which said reagent is part.

14. The method of claim 13 wherein the time the uranium molecules and the reagent are in contact and at the reaction temperature is less than $10^{-3}$ seconds.

15. The method of claim 14 wherein the reagent is a short lived intermediate generated in situ.

* * * * *